US009581867B2

(12) United States Patent
Li et al.

(10) Patent No.: US 9,581,867 B2
(45) Date of Patent: Feb. 28, 2017

(54) DISPLAY PANEL HAVING A PLURALITY OF PIXEL ELECTRODE BARS WITH DIFFERENT SPACING

(71) Applicant: Au Optronics Corporation, Hsinchu (TW)

(72) Inventors: Zheng-Han Li, Pingtung County (TW); Kuo-Yu Huang, Hsinchu County (TW); Ruei-Pei Chen, Hsinchu County (TW); Maw-Song Chen, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 77 days.

(21) Appl. No.: 14/521,470

(22) Filed: Oct. 23, 2014

(65) Prior Publication Data
US 2016/0043104 A1    Feb. 11, 2016

(30) Foreign Application Priority Data

Aug. 7, 2014 (TW) .............................. 103127072 A

(51) Int. Cl.
G09G 5/02 (2006.01)
G02F 1/1343 (2006.01)
G02F 1/1335 (2006.01)
(52) U.S. Cl.
CPC .. *G02F 1/134363* (2013.01); *G02F 1/133512* (2013.01)
(58) Field of Classification Search
CPC ..................................................... H01L 27/124
USPC ................................................. 345/695, 206
See application file for complete search history.

(56) References Cited

U.S. PATENT DOCUMENTS

| 7,768,597 B2 | 8/2010 | Chang |
| 9,007,555 B2 | 4/2015 | Chang et al. |
| 2004/0125278 A1* | 7/2004 | Park .................. G02F 1/133514 349/106 |

(Continued)

FOREIGN PATENT DOCUMENTS

| CN | 102778795 | 11/2012 |
| TW | 201217876 | 5/2012 |
| TW | I424238 | 1/2014 |

OTHER PUBLICATIONS

"Office Action of Taiwan Counterpart Application", issued on May 19, 2016, p. 1-p. 7.

Primary Examiner — Long D Pham
(74) Attorney, Agent, or Firm — Jianq Chyun IP Office

(57) ABSTRACT

A display panel including first and second pixel structures and a light shielding pattern layer is provided. The first pixel structure includes a first pixel electrode including first pixel electrode bars, wherein a first maximum spacing is formed between any two adjacent first pixel electrode bars of the first pixel structure. The second pixel structure includes a second pixel electrode including second pixel electrode bars, wherein a second maximum spacing which is larger than the first maximum spacing is formed between two adjacent second pixel electrode bars of the second pixel structure. The light shielding pattern layer has first and second light shielding portions. The area of the second light shielding portion is larger than the area of the first light shielding portion. The first pixel electrode is close to the second light shielding portion and the second pixel electrode is away from the second light shielding portion.

13 Claims, 12 Drawing Sheets

(56) References Cited

U.S. PATENT DOCUMENTS

2012/0033001 A1* 2/2012 Kim .................... G09G 3/3659
                                                            345/697
2012/0105784 A1   5/2012 Ho et al.
2012/0182511 A1   7/2012 Hisada et al.
2013/0257700 A1* 10/2013 Chang ............... G02F 1/134363
                                                             345/87

* cited by examiner

DISPLAY PANEL HAVING A PLURALITY OF PIXEL ELECTRODE BARS WITH DIFFERENT SPACING

CROSS-REFERENCE TO RELATED APPLICATION

This application claims the priority benefit of Taiwan application serial no. 103127072, filed on Aug. 7, 2014. The entirety of the above-mentioned patent application is hereby incorporated by reference herein and made a part of this specification.

BACKGROUND OF THE INVENTION

1. Field of the Invention

The invention generally relates to a display panel, and more particularly, to a display panel having favorable display quality.

2. Description of Related Art

With rapid technological development, display panels are ubiquitous in today's society, and have broadly been applied in various electronic products, such as Tablet PCs, Smart Phones or Flat-screen TVs. The display panel is typically configured with shielding patterns capable of providing a shielding effect for preventing light leakage. However, an aperture ratio of the display panel is thus lowered. In addition, under some circumstances, the shielding patterns usually have different sizes for corresponding to different positions of the display panel, and thus display panel would have different aperture ratio, thereby resulting in an uneven brightness distribution. Hence, the displayed screen is apt to produce a dot mura phenomena, thereby causing the display panel unable to provide a user with a more ideal visual effect.

SUMMARY OF THE INVENTION

The invention is directed to a display panel capable of preventing a dot mura phenomena.

The invention provides a display panel including a first substrate, a second substrate. a plurality of scan lines, a plurality of data lines, a plurality of first pixel structures, a plurality of second pixel structures, and a light shielding pattern layer. The second substrate is located opposite to the first substrate. The scan lines and the data lines are located on the first substrate. The first pixel structures are located on the first substrate, each of the first pixel structures is electrically connected with the corresponding scan line and the corresponding data line, and each of the first pixel structures includes a first pixel electrode. The first pixel electrode has a plurality of first pixel electrode bars, wherein a first maximum spacing is formed between any two adjacent first pixel electrode bars in each of the first pixel structures. The second pixel structures are located on the first substrate, each of the second pixel structures is electrically connected with the corresponding scan line and the corresponding data line, and each of the second pixel structures includes a second pixel electrode. The second pixel electrode has a plurality of second pixel electrode bars, wherein a second maximum spacing formed between two adjacent second pixel electrode bars in each of the second pixel structures is greater than the first maximum spacing. The light shielding pattern layer is located on the first substrate or on the second substrate, the light shielding pattern layer has a first light shielding portion and a second light shielding portion, and the area of the second light shielding portion is greater than the area of the first light shielding portion, wherein the second pixel electrode is close to the second light shielding portion, and the first pixel electrode is away from the second light shielding portion.

The invention further provides a display panel including a first substrate, a second substrate, a plurality of scan lines, a plurality of data lines, a plurality of first pixel structures, a plurality of second pixel structures, and a light shielding pattern layer. The second substrate is located opposite to the first substrate. The scan lines and the data lines are located on the first substrate. The first pixel structures are located on the first substrate, each of the first pixel structures is electrically connected with the corresponding scan line and the corresponding data line, and each of the first pixel structures includes a first pixel electrode. The first pixel electrode has a plurality of first pixel electrode bars. The second pixel structures are located on the first substrate, each of the second pixel structures is electrically connected with the corresponding scan line and the corresponding data line, and each of the second pixel structures includes a second pixel electrode. The second pixel electrode has a plurality of second pixel electrode bars, wherein the quantity of the second pixel electrode bars is greater than the quantity of the first pixel electrode bars. The light shielding pattern layer is located on the first substrate or on the second substrate, the light shielding pattern layer has a first light shielding portion and a second light shielding portion, the area of the second light shielding portion is greater than the area of the first light shielding portion, wherein the second pixel electrode is close to the second light shielding portion, and the first pixel electrode is away from the second light shielding portion.

In view of the foregoing, in the display panel of the invention, the second pixel electrode being close to the second light shielding portion with larger area has the second maximum spacing greater than the first maximum spacing of the first pixel electrode, or has the second pixel electrode bars with the quantity greater than that of the first pixel electrode bars, and thereby allows the display panel to have uniform brightness distribution and may prevent dot mura phenomena, thus providing favorable display quality.

To make the aforementioned and other features and advantages of the application more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
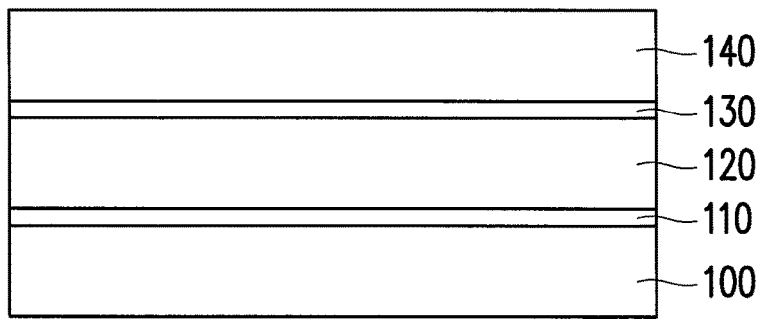
FIG. 1 is a side view illustrating a display panel according to an embodiment of the invention.
Figure 2:
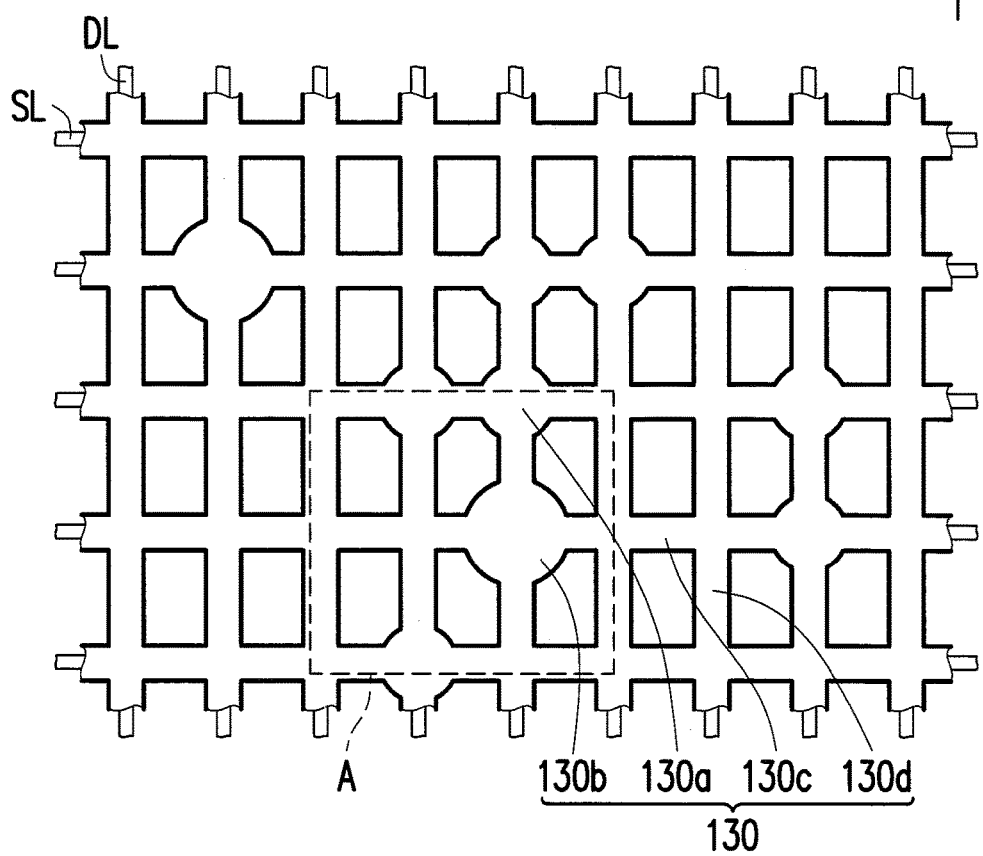
FIG. 2 is a schematic top view of the display panel in FIG. 1.
Figure 3:
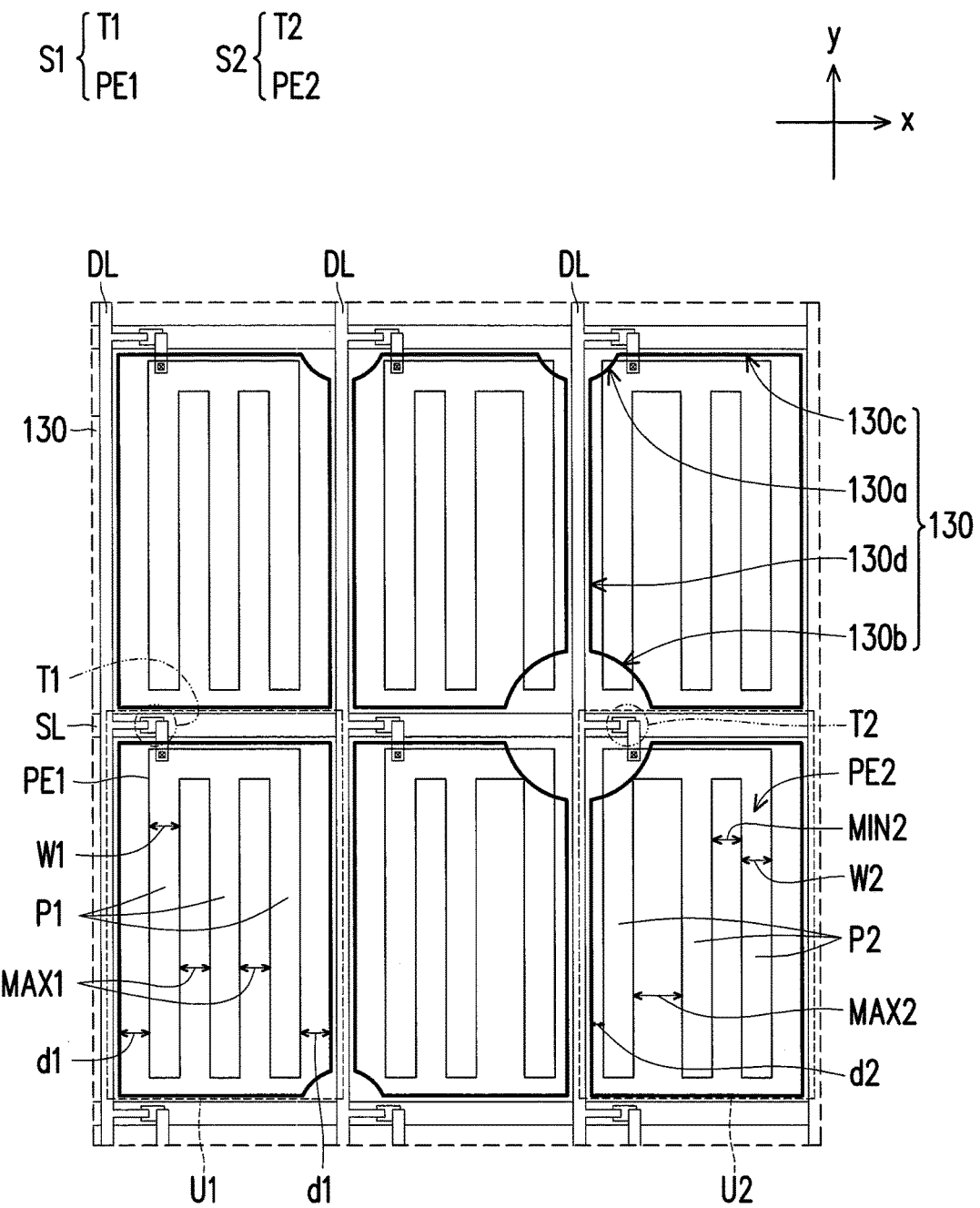
FIG. 3 is an enlarged schematic view of an area A in FIG. 2.

FIG. 1 is a side view illustrating a display panel 10 according to an embodiment of the invention. FIG. 2 is a schematic top view of the display panel 10 of FIG. 1. FIG. 3 is an enlarged schematic view of area A in FIG. 2.

Referring to FIG. 1 through FIG. 3, the display panel 10 of the present embodiment includes a first substrate 100, a pixel array layer 110, a display medium 120, a light shielding pattern layer 130, and a second substrate 140.

The first substrate 100 and the second substrate 140 are disposed opposite to each other. Materials of the first substrate 100 and the second substrate 140 may respectively be glass, quartz, organic polymer, or other suitable material. The display medium 120 is disposed between the first substrate 100 and the second substrate 140. The display medium 120 is, for example, a liquid crystal material. In other words, the display panel 10 is, for example, a liquid crystal display panel. Specifically, the display panel 10 is, for example, an in-plane switching (IPS) liquid crystal display panel or a fringe field switching (FFS) liquid crystal display panel, but not limited thereto.

The pixel array layer 110 is disposed on the first substrate 100. The pixel array layer 110 includes a plurality of scan lines SL, a plurality of data lines DL, a plurality of first pixel structures S1, and a plurality of second pixel structures S2. In the present embodiment, each of the scan lines SL extends along an X direction, and each of the data lines DL extends along a Y direction. The scan lines SL and the data lines DL may be located at different film layers, whereby an insulating layer (not shown) is sandwiched between the two. In addition, the scan lines SL and the data lines DL define a plurality of first pixel area U1 and a plurality of second pixel area U2 on the first substrate 100. The material of the scan lines SL and the data lines DL is, for example, metal.

The first pixel structures S1 are correspondingly disposed in the first pixel area U1, respectively. Each of the first pixel structures S1 includes a first active device T1 and a first pixel electrode PE1 electrically connected to the first active device T1, and each of the first pixel structures S1 is electrically connected with the corresponding scan line SL and the corresponding data line DL through the first active device T1. The first active device T1 may be a thin film transistor or any other active device known by those skilled in the art, and thus no further elaboration will be provided.

The first pixel electrode PE1 has a plurality of first pixel electrode bars P1. In each of the first pixel structures S1, a first maximum spacing MAX1 is between any two adjacent first pixel electrode bars P1. Herein, "any two adjacent first pixel electrode bars P1" is defined as any two of the first pixel electrode bars P1 not having other first pixel electrode bar P1 therebetween. Moreover, every first pixel electrode bar P1 has the same width W1. In an embodiment, the width W1 is, for example, 2 μm, and the first maximum spacing MAX1 is, for example, 3 μm of the first pixel structures S1. In addition, the material of the first pixel electrode PE1 is, for example, a transparent conductive layer including metal oxide, such as indium-tin-oxide (ITO), indium zinc oxide (IZO), aluminum tin oxide (ATO), aluminum zinc oxide (AZO), indium gallium zinc oxide (IGZO), or other suitable oxide, or a stacked layer consisting of at least two of the above.

The second pixel structures S2 are correspondingly disposed in the second pixel area U2, respectively. The second pixel structures S2 are pixel structures around the second light shielding portion 130b; namely, from a top view perspective, the second light shielding portion 130b is surrounded by four adjacent second pixel structures S2; and the first pixel structures S1 are relatively away from the second light shielding portion 130b and not adjacent to the second light shielding portion 130b. Each of the second pixel structures S2 includes a second active device T2 and a second pixel electrode PE2 electrically connected to the second active device T2, and each of the second pixel structures S2 is electrically connected with the corresponding scan line SL and the corresponding data line DL through the second active device T2. The second active device T2 may be a thin film transistor or any other active device known by those skilled in the art, and thus no further elaboration will be provided.

The second pixel electrode PE2 has a plurality of second pixel electrode bars P2. In each of the second pixel structures S2, a second maximum spacing MAX2 is between two adjacent second pixel electrode bars P2 which are close to the second light shielding portion 130b, wherein the second maximum spacing MAX2 is greater than the first maximum spacing MAX1, a ratio of the second maximum spacing MAX2 to the first maximum spacing MAX1 is r, and 1<r≤2. Herein, "two adjacent second pixel electrode bars P2" is defined as two of the second pixel electrode bars P2 not having other second pixel electrode bar P2 therebetween. Moreover, as shown in FIG. 3, in each of the second pixel structures S2, a second minimum spacing MIN2 formed away from the second light shielding portion 130b and between other two adjacent second pixel electrode bar P2 is smaller than the second maximum spacing MAX2 therebetween. Namely, in the present embodiment, the second pixel electrode bars P2 of each of the second pixel structures S2 are not disposed in a manner that the spacing between any two adjacent second pixel electrode bars P2 is the same as one another. In an embodiment, the second minimum spacing MIN2 and the first maximum spacing MAX1 are the same, wherein the second minimum spacing MIN2 is, for example, 3 μm.

Moreover, in each of the second pixel structures S2, each of the second pixel electrode bars P2 has the same width W2, and the width W2 is the same as the width W1 of the first pixel electrode bars P1. In an embodiment, the width W2 is, for example, 2 μm, and the second maximum spacing MAX2 is, for example, 3.5 μm, 4 μm or 5 μm in the second pixel structures S2. In addition, as shown in FIG. 3, in each of the second pixel structures S2, the two adjacent second pixel electrode bars P2 having the second maximum spacing MAX2 are close to the data lines DL which is overlapped with the second light shielding portion 130b. Namely, one of the two adjacent second pixel electrode bars P2 having the second maximum spacing MAX2 must be the outermost second pixel electrode bar P2 which is close to the data lines DL overlapped with the second light shielding portion 130b.

The material of the second pixel electrode PE2 is, for example, a transparent conductive layer including metal oxide, such as ITO, IZO, ATO, AZO, IGZO, or other suitable oxide, or a stacked layer consisting of at least two of the above.

The light shielding pattern layer 130 is disposed on the second substrate 140. As shown in FIG. 2, the light shielding pattern layer 130 has a first light shielding portion 130a and a second light shielding portion 130b, wherein the size/area of the second light shielding portion 130b is greater than that of the first light shielding portion 130a. Namely, as compared to the first light shielding portion 130a, the second light shielding portion 130b has a greater width and greater shielding area. In the present embodiment, the second light shielding portion 130b is used to shield a main spacer (not shown) that enables the cell gap between the first substrate 100 and the second substrate 140 to be uniform, so as to prevent light leakage from being caused by scratching of an alignment film (not shown) when the main spacer moves, and the first light shielding portion 130a is used to shield an auxiliary spacer (not shown). Moreover, the light shielding pattern layer 130 further has a third light shielding portion 130c and a fourth light shielding portion 130d, wherein the third light shielding portion 130c and the fourth light shielding portion 130d are respectively overlapped with the scan lines SL and the data lines DL, and connected with the first light shielding portion 130a and the second light shielding portion 130b. The first light shielding portion 130a and the second light shielding portion 130b are both overlapped with intersections between the scan lines SL and the data lines DL, and the width of the first light shielding portion 130a and the width of the second light shielding portion 130b are both greater than the width of the third light shielding portion 130c and the width of the fourth light shielding portion 130d.

In addition, as shown in FIG. 3, the second pixel electrode PE2 is close to the second light shielding portion 130b, and the first pixel electrode PE1 is away from the second light shielding portion 130b. Namely, in the present embodiment, pixel structures overlapping with the second light shielding portion 130b in the space are defined as the second pixel structures S2, and pixel structures not overlapping with the second light shielding portion 130b in the space are defined as the first pixel structures S1. Furthermore, since the size/area of the second light shielding portion 130b is greater than that of the first light shielding portion 130a, the aperture ratio of the second pixel area U2 is smaller than the aperture ratio of the first pixel area U1. In the present embodiment, the percentage rate of the aperture ratio of the second pixel area U2 with respect to the aperture ratio of the first pixel area U1 is less than 92%. In general, under a conventional situation, a displayed screen of the display panel is apt to produce a dot mura phenomena due to an uneven brightness distribution.

In addition, as shown in FIG. 3, the outermost first pixel electrode bar P1 and the fourth light shielding portion 130d are not overlapped with each other, and the outermost second pixel electrode bar P2 and the fourth light shielding portion 130d are not overlapped with each other. In detail, on a vertical plane of projection, a minimum distance d2 (i.e. a horizontal minimum distance) between the outermost second pixel electrode bar P2 and the fourth light shielding portion 130d is less than a minimum distance d1 (i.e. a horizontal minimum distance) between each of the outermost first pixel electrode bars P1 and the fourth light shielding portion 130d, wherein the minimum distance d2 is between 0.5 μm and 2 μm. Hence, as compared to the first pixel electrode PE1, the outermost second pixel electrode bar P2 of the second pixel electrode PE2 that having the minimum distance d2 with the fourth light shielding portion 130d is closer to the fourth light shielding portion 130d.

Further, in the present embodiment, in each one of the four adjacent second pixel structures S2 around the second light shielding portion 130b, the outermost second pixel electrode bar P2 of the second pixel electrode PE2 that has the minimum distance d2 from the fourth light shielding portion 130d is closest to the second light shielding portion 130b. That is, in each one of the four adjacent second pixel structures S2 around the second light shielding portion 130b, one of the two adjacent second pixel electrode bars P2 that form the second maximum spacing MAX2 is closest to the second light shielding portion 130b, namely, the second maximum spacings MAX2 of the four adjacent second pixel structures S2 are all close to the second light shielding portion 130b. However, the invention is not limited thereto. In other embodiments, one of the two adjacent second pixel electrode bars P2 that form the second maximum spacing MAX2 of at least one of the four adjacent second pixel structures S2 around the second light shielding portion 130b may also be designed as being closest to the second light shielding portion 130b.

It is to be explained that, in the present embodiment, through disposing the light shielding pattern layer 130, components and wirings in the display panel 10 not desired to be seen by a user can be shielded, and light leakage can be prevented; and through disposing the second pixel electrode PE2, dot mura phenomena can be prevented. Further, in the present embodiment, even if the percentage rate of the aperture ratio of the second pixel area U2 with respect to the aperture ratio of the first pixel area U1 is less than 92%, the display panel 10 may still has favorable display quality, and the reasons are provided as follows. Since the liquid crystal molecules are driven by electrical fields generated by the electrodes, and in the present embodiment, as described in above, the outermost second pixel electrode bar P2 has the minimum distance d2 from the fourth light shielding portion 130d connected with the second light shielding portion 130b, the liquid crystal utilization rate in the second pixel area U2 can be enhanced. As a result, brightness loss in the second pixel area U2 due to an aperture ratio reduction can be compensated. Namely, in each of the second pixel structures S2, by disposing the second pixel electrode PE2 having the second maximum spacing MAX2 greater than the first maximum spacing MAX1 between two adjacent second pixel electrode bars P2, liquid crystal efficiency and transmittance in each of the second pixel area U2 can both be increased, thereby enabling the display panel 10 to have favorable display quality.

According to the above, those skilled in the art should be able to understand that, the display panel 10 of the invention also includes other components in a conventional IPS liquid crystal display panel or a conventional FFS liquid crystal display panel, such as a common electrode, a polarizer, a color filter, an alignment film, etc.

Moreover, structural configuration of the first pixel electrode PE1 and the second pixel electrode PE2 of the present embodiment are not limited to the ones depicted in FIG. 3. Namely, it is within the scope of the present embodiment as long as the second maximum spacing MAX2 greater than the first maximum spacing MAX1 is between two adjacent second pixel electrode bars P2, and the first pixel electrode PE1 and the second pixel electrode PE2 may be any type of structural configuration of pixel electrodes in the conventional IPS liquid crystal display panel or the conventional FFS liquid crystal display panel. For instance, although the first pixel electrode bars P1 and the second pixel electrode bars P2 are all illustrated as linear shapes in FIG. 3, in other embodiments, the shapes of the first pixel electrode bars P1 and the second pixel electrode bars P2 may also be "<<" shapes.

Moreover, although quantities of the first pixel electrode bars P1 and the second pixel electrode bars P2 in FIG. 3 are both illustrated as 3, the invention is not limited thereto. In other embodiments, the quantities of the first pixel electrode bars P1 and the second pixel electrode bars P2 may be adjusted according to the practical requirements of the display panel.

In addition, although the light shielding pattern layer 130 of the present embodiment is disposed on the second substrate 140, the invention is not limited thereto. In other embodiments, the light shielding pattern layer 130 may also be disposed on the first substrate 100.

Figure 4:
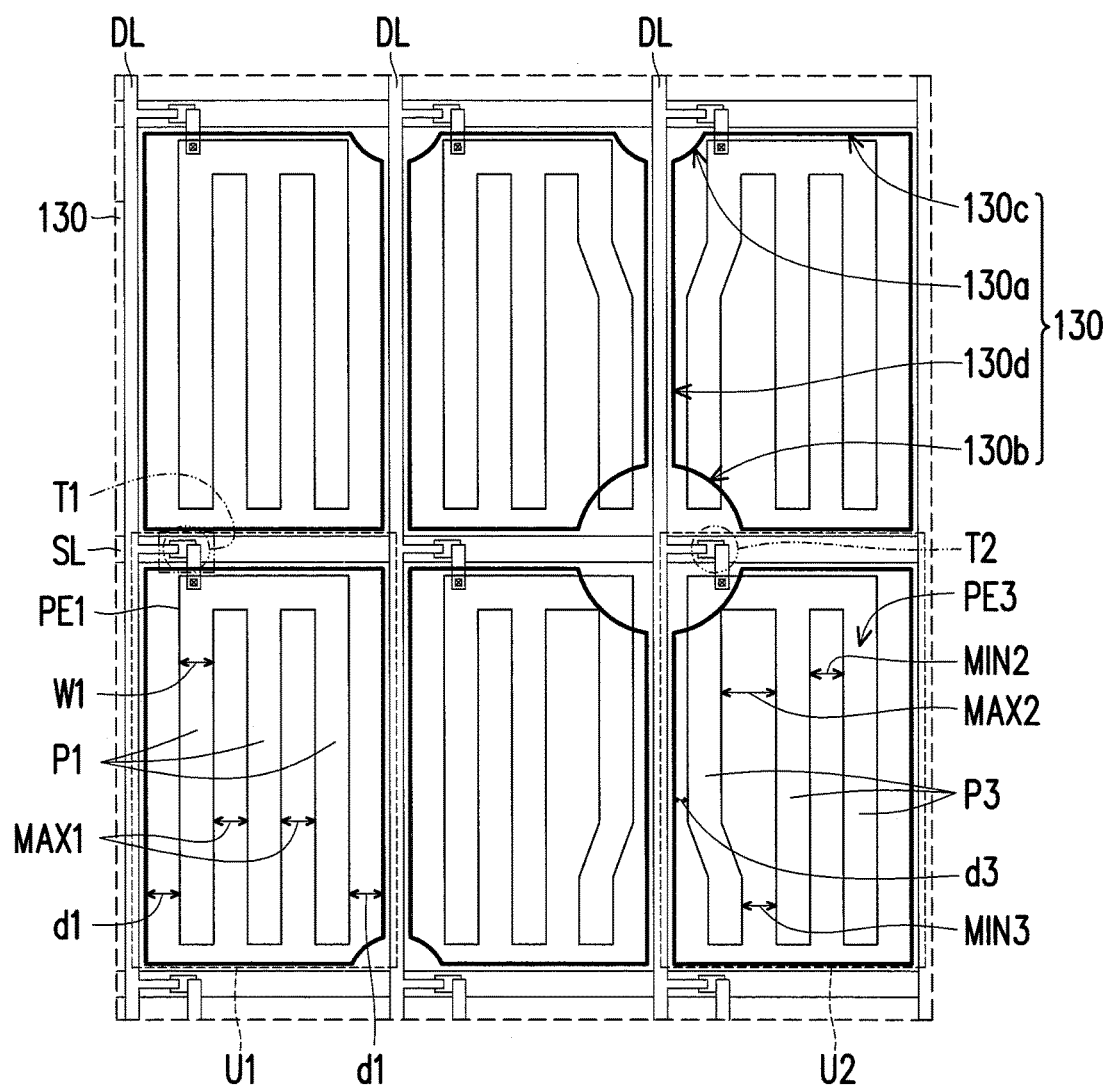
FIG. 4 is a partially enlarged schematic top view illustrating a display panel according to another embodiment of the invention.

FIG. 4 is a partially enlarged schematic top view illustrating a display panel 20 according to another embodiment of the invention. A complete schematic top view of the display panel 20 of FIG. 4 may be referred to FIG. 2, wherein the position where the display panel 20 of FIG. 4 is located may be referred to the position of the area A in FIG. 2. Moreover, the embodiment depicted in FIG. 4 is similar to the embodiments depicted in FIG. 1 through FIG. 3, and thus identical components are indicated with the same reference numbers, and descriptions thereof will not be repeated.

Referring to FIG. 4 and FIG. 3, a difference between the display panel 20 of the present embodiment and the display panel 10 of the embodiment depicted in FIG. 3 lies in that: in each of the second pixel structures S3, the two adjacent second pixel electrode bars P3 further has a second minimum spacing MIN3 therebetween, and the second minimum spacing MIN3 is different from the second maximum spacing MAX2. Namely, in the present embodiment, there are different spacings between the two adjacent second pixel electrode bars P3. In detail, since the second minimum spacing MIN3 is smaller than the second maximum spacing MAX2, on a vertical plane of projection, a minimum distance d3 (i.e. a horizontal minimum distance) between the outermost second pixel electrode bar P3 and the fourth light shielding portion 130d connected with the second light shielding portion 130b is less than the minimum distance d1 between each of the outermost first pixel electrode bars P1 and the fourth light shielding portion 130d, wherein the minimum distance d3 is between 0.5 μm and 2 μm. Hence, as compared to the first pixel electrode PE1, a portion of the outermost second pixel electrode bar P3 having the minimum distance d3 from the fourth light shielding portion 130d of the second pixel electrode PE3 is closer to the second light shielding portion 130b. In an embodiment, the second minimum spacing MIN3 in each of the second pixel structures S3 is the same as the second minimum spacing MIN2, and is, for example, 3 μm.

Further, in the embodiment of FIG. 4, in each one of the four adjacent second pixel structures S3 around the second light shielding portion 130b, a portion of the outermost second pixel electrode bar P3 of the second pixel electrode PE3 that have the minimum distance d3 from the fourth light shielding portion 130d is closest to the second light shielding portion 130b. However, the invention is not limited thereto. In other embodiments, it may also be designed in a manner that, in at least one of the four adjacent second pixel structures S3 around the second light shielding portion 130b, a portion of the outermost second pixel electrode bar P3 that has the minimum distance d3 from the fourth light shielding portion 130d is closest to the second light shielding portion 130b.

It is to be noted that, same as the embodiment of FIG. 3, in the present embodiment, by disposing the second pixel electrode PE3 having the second maximum spacing MAX2 greater than the first maximum spacing MAX1 between the two adjacent second pixel electrode bars P3 in each of the second pixel structures S3, the liquid crystal utilization rate in the second pixel area U2 can be increased. As a result, brightness loss in the second pixel area U2 due to the aperture ratio reduction can be compensated.

Figure 5:
FIG. 5 is a partially enlarged schematic top view illustrating a display panel according to another embodiment of the invention.
Figure 5:
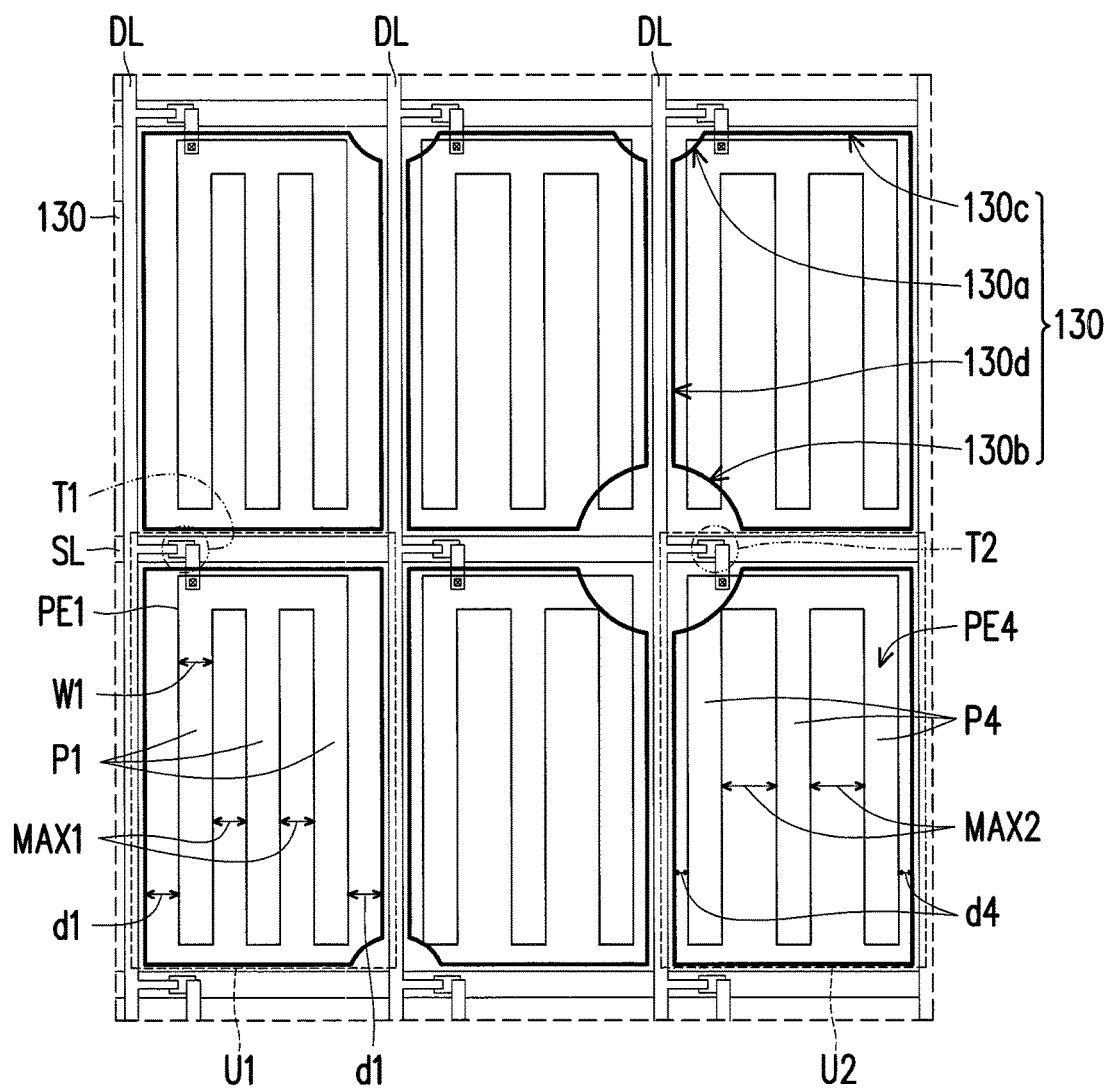

FIG. 5 is a partially enlarged schematic top view illustrating a display panel 30 according to another embodiment of the invention. A complete schematic top view of the display panel 30 of FIG. 5 may be referred to FIG. 2, wherein the position where the display panel 30 of FIG. 5 is located may be referred to the position of the area A in FIG. 2. Moreover, the embodiment depicted in FIG. 5 is similar to the embodiment depicted in FIG. 1 through FIG. 3, and thus identical components are indicated with the same reference numbers, and descriptions thereof will not be repeated.

Referring to FIG. 5 and FIG. 3, a difference between the display panel 30 of the present embodiment and the display panel 10 of the embodiment in FIG. 3 lies in that: in each of the second pixel structures S4, the second maximum spacing MAX2 is between any two adjacent second pixel electrode bars P4 of the second pixel electrode PE4. In detail, in the present embodiment, a distance between any two adjacent first pixel electrode bars P1 is constant, a distance between any two adjacent second pixel electrode bars P4 is constant, and the distance between any two adjacent second pixel electrode bars P4 is greater than the distance between any two adjacent first pixel electrode bars P1.

As a result, on the vertical plane of projection, a minimum distance d4 between each of the outermost second pixel electrode bars P4 of the second pixel electrode PE4 and the fourth light shielding portion 130d is less than the minimum distance d1 between each of the outermost first pixel electrode bars P1 of the first pixel electrode PE1 and the fourth light shielding portion 130d, wherein the minimum distance d4 is between 0.5 μm and 2 μm. Hence, as compared to the first pixel electrode PE1, the outermost second pixel electrode bars P4 of the second pixel electrode PE4 are all closer to the second light shielding portion 130b.

Similar to the embodiment of FIG. 3, in the present embodiment, by disposing the second pixel electrode PE4 having the second maximum spacing MAX2 greater than the first maximum spacing MAX1, the liquid crystal molecules at the edges of the second pixel area U2 may effectively be used, thereby enhancing the liquid crystal efficiency of the second pixel area U2. As a result, brightness loss in the second pixel area U2 due to the aperture ratio reduction can be compensated, thereby dot mura phenomena can be prevented, and providing the display panel 30 with favorable display quality.

Figure 6:
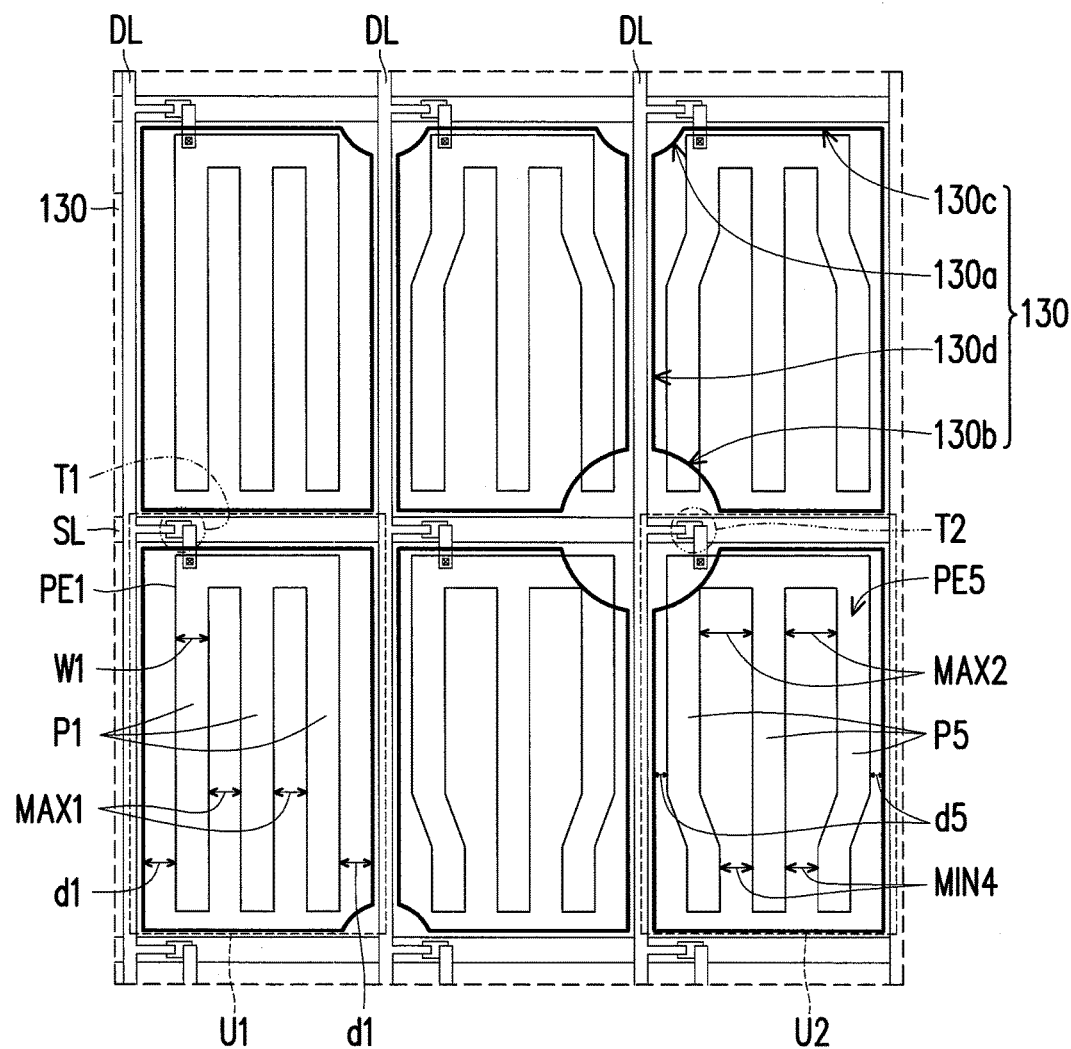
FIG. 6 is a partially enlarged schematic top view illustrating a display panel according to another embodiment of the invention.

FIG. 6 is a partially enlarged schematic top view illustrating a display panel 40 according to another embodiment of the invention. A complete schematic top view of the display panel 40 of FIG. 6 may be referred to FIG. 2, wherein the position where the display panel 40 of FIG. 6 is located may be referred to the position of the area A in FIG. 2. Moreover, the embodiment depicted in FIG. 6 is similar to the embodiment depicted in FIG. 5, and thus identical components are indicated with the same reference numbers, and descriptions thereof will not be repeated.

Referring to FIG. 6 and FIG. 5, a difference between the display panel 40 of the present embodiment and the display panel 30 of the embodiment in FIG. 5 lies in that: in each of the second pixel structures S5, a second minimum spacing MIN4 different from the second maximum spacing MAX2 is between any two adjacent second pixel electrode bars P5 of the second pixel electrode PE5. In detail, since the second minimum spacing MIN4 is smaller than the second maximum spacing MAX2, on the vertical plane of projection, a minimum distance d5 between each of the outermost second pixel electrode bars P5 and the fourth light shielding portion 130d is less than the minimum distance d1 between each of the outermost first pixel electrode bars P1 and the fourth light shielding portion 130d, wherein the minimum distance d5 is between 0.5 μm and 2 μm. Hence, as compared to the first pixel electrode PE1, a portion of each of the outermost second pixel electrode bars P5 of the second pixel electrode PE5 is closer to the fourth light shielding portion 130d. In an embodiment, the second minimum spacing MIN4 in the second pixel structures S5 is, for example, 3 μm.

Further, in the embodiment of FIG. 6, in each one of the four adjacent second pixel structures S5 around the second light shielding portion 130b, as compared to the portion of each of the outermost second pixel electrode bars P5 that is corresponding to the second minimum spacing MIN4, the portion of each of the outermost second pixel electrode bars P5 that is corresponding to the second maximum spacing MAX2 is closer to the second light shielding portion 130b. However, the invention is not limited thereto. In other embodiments, it may also be designed in a manner that, in at least one of the four adjacent second pixel structures S5 around the second light shielding portion 130b, a portion of each of the outermost second pixel electrode bars P5 that is corresponding to the second maximum spacing MAX2 is closer to the second light shielding portion 130b.

Noteworthily, similar to the embodiment of FIG. 5, in the present embodiment, between any two adjacent second pixel electrode bars P5 in each of the second pixel structures S5, by disposing the second pixel electrode PE5 having the second maximum spacing MAX2 greater than the first maximum spacing MAX1, the liquid crystal molecules at the edges of the second pixel area U2 may effectively be used, thereby enhancing the liquid crystal efficiency of the second pixel area U2. As a result, brightness loss in the second pixel area U2 due to the aperture ratio reduction can be compensated, thereby dot mura phenomena can be prevented, and providing the display panel 40 with favorable display quality.

Figure 7:
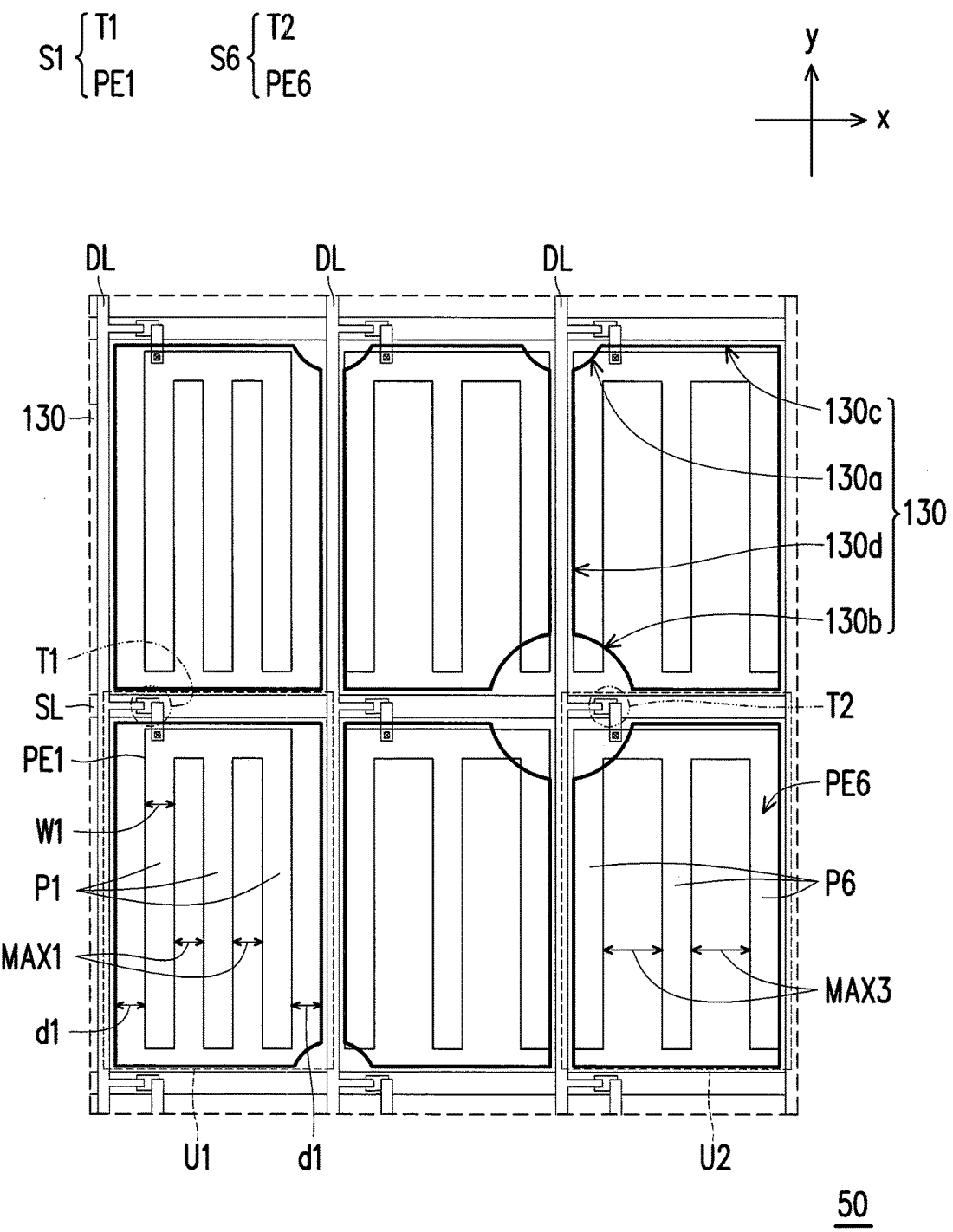
FIG. 7 is a partially enlarged schematic top view illustrating a display panel according to another embodiment of the invention.

FIG. 7 is a partially enlarged schematic top view illustrating a display panel 50 according to another embodiment of the invention. A complete schematic top view of the display panel 50 of FIG. 7 may be referred to FIG. 2, wherein the position where the display panel 50 of FIG. 7 is located may be referred to the position of the area A in FIG. 2. Moreover, the embodiment depicted in FIG. 7 is similar to the embodiment depicted in FIG. 5, and thus identical components are indicated with the same reference numbers, and descriptions thereof will not be repeated.

Referring to FIG. 7 and FIG. 5, differences between the display panel 50 of the present embodiment and the display panel 30 of the embodiment in FIG. 5 lie in that: on the vertical plane of projection, a side of each of the outermost second pixel electrode bars P6 of the second pixel electrode PE6 is aligned with a side the fourth light shielding portion 130d; and a second maximum spacing MAX3 is between any two adjacent second pixel electrode bars P6, wherein the second maximum spacing MAX3 is approximately between 1 μm and 5 μm. That is, on the vertical plane of projection, there is no spacing between the outermost second pixel electrode bars P6 of the second pixel electrode PE6 and the fourth light shielding portion 130d connected with the second light shielding portion 130b, namely, a distance therebetween is 0 μm. Hence, as compared to the first pixel electrode PE1, the outermost second pixel electrode bars P6 of the second pixel electrode PE6 are closer to the second light shielding portion 130b. Therefore, the liquid crystal efficiency of the second pixel area U2 can be enhanced, and dot mura phenomena can be prevented, thereby providing the display panel 50 with favorable display quality.

Moreover, according to the above, those skilled in the art should be able to understand that, the minimum distance d2, the minimum distance d3 and the minimum distance d5 in the embodiments of FIG. 3, FIG. 4 and FIG. 6 may also be 0 μm.

Figure 8:
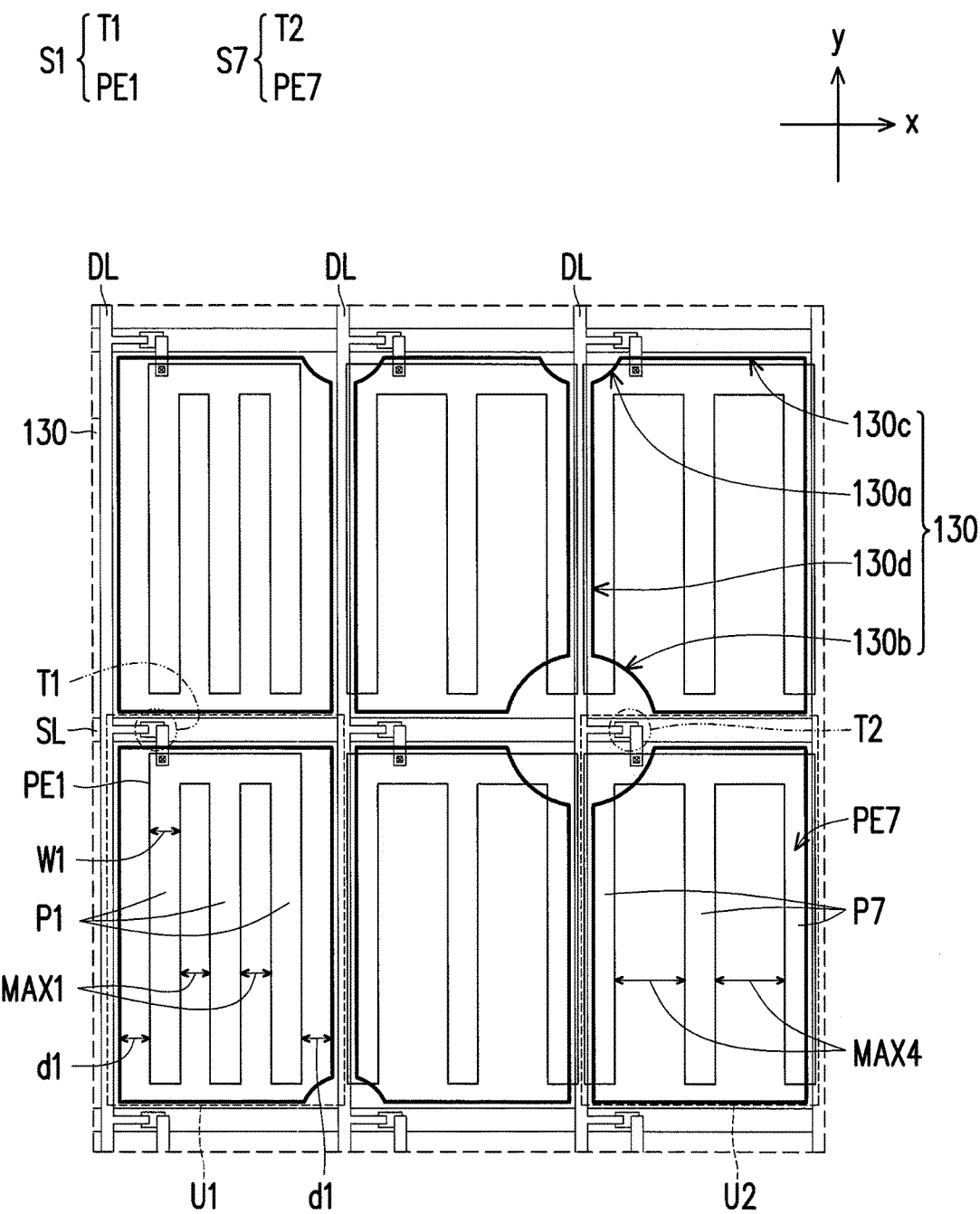
FIG. 8 is a partially enlarged schematic top view illustrating a display panel according to another embodiment of the invention.

FIG. 8 is a partially enlarged schematic top view illustrating a display panel 60 according to another embodiment of the invention. A complete schematic top view of the display panel 60 of FIG. 8 may be referred to FIG. 2, wherein the position where the display panel 60 of FIG. 8 is located may be referred to the position of the area A in FIG. 2. Moreover, the embodiment depicted in FIG. 8 is similar to the embodiment depicted in FIG. 7, and thus identical components are indicated with the same reference numbers, and descriptions thereof will not be repeated.

Referring to FIG. 8 and FIG. 7, differences between the display panel 60 of the present embodiment and the display panel 50 of the embodiment in FIG. 7 lie in that: on the vertical plane of projection, the outermost second pixel electrode bars P7 of the second pixel electrode PE7 are overlapped with the fourth light shielding portion 130d; and a second maximum spacing MAX4 is between any two adjacent second pixel electrode bars P7, wherein the second maximum spacing MAX4 is approximately between 1 μm to 5 μm. Hence, as compared to the first pixel area U1, the liquid crystal utilization rate in the second pixel area U2 is higher. As a result, brightness loss in the second pixel area U2 due to the aperture ratio reduction can be compensated, thereby dot mura phenomena can be prevented, and providing the display panel 60 with favorable display quality.

Moreover, according to the above, those skilled in the art should be able to understand that, the outermost second pixel electrode bar P2 having the minimum distance d2 from the fourth light shielding portion 130d in the embodiment of FIG. 3, the outermost second pixel electrode bar P3 having the minimum distance d3 from the fourth light shielding portion 130d in the embodiment of FIG. 4, and the outermost second pixel electrode bars P5 in the embodiment of FIG. 6 may also be overlapped with the fourth light shielding portion 130d.

Figure 9:
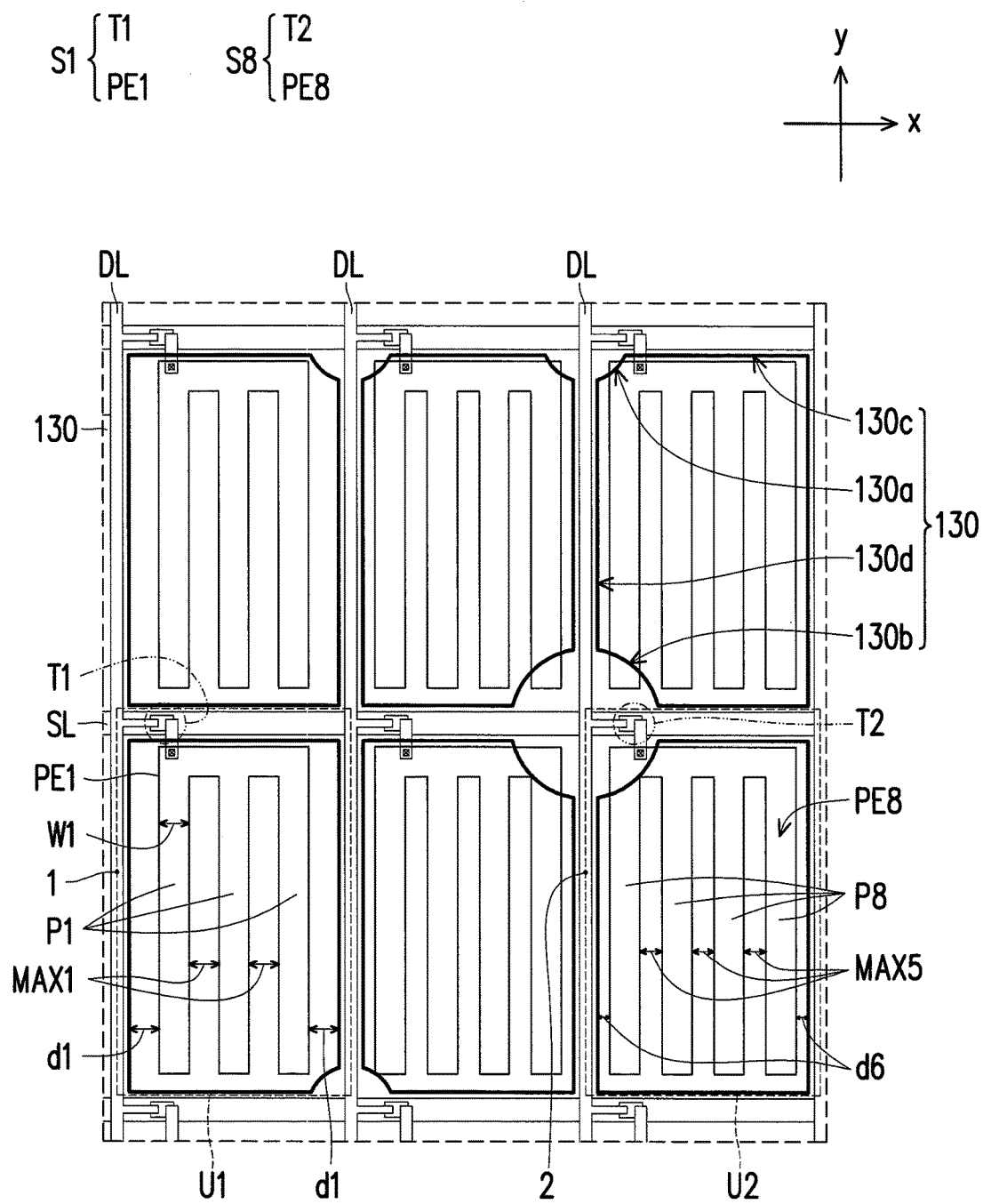
FIG. 9 is a partially enlarged schematic top view illustrating a display panel according to another embodiment of the invention.

FIG. 9 is a partially enlarged schematic top view illustrating a display panel 70 according to another embodiment of the invention. A complete schematic top view of the display panel 70 of FIG. 9 may be referred to FIG. 2, wherein the position where the display panel 70 of FIG. 9 is located may be referred to the position of the area A in FIG. 2. Moreover, the embodiment depicted in FIG. 9 is similar to the embodiment depicted in FIG. 1 through FIG. 3, and thus identical components are indicated with the same reference numbers, and descriptions thereof will not be repeated.

Referring to FIG. 9 and FIG. 3, differences between the display panel 70 of the present embodiment and the display panel 10 of the embodiment in FIG. 3 lie in that: in each of the second pixel structures S8, the quantity of the second pixel electrode bars P8 of the second pixel electrode PE8 is 4, and a second maximum spacing MAX5 is between any two adjacent second pixel electrode bars P8. Namely, in the present embodiment, the quantity of the second pixel electrode bars P8 of the second pixel electrode PE8 is greater than the quantity of the first pixel electrode bars P1 of the first pixel electrode PE1.

Moreover, as shown in FIG. 9, the outermost second pixel electrode bars P8 and the fourth light shielding portion 130*d* are not overlapped with each other. In detail, on the vertical plane of projection, a minimum distance d6 is between each of the outermost second pixel electrode bars P8 and the fourth light shielding portion 130*d* connected with the second light shielding portion 130*b*, wherein the minimum distance d6 is less than the minimum distance d1, and the minimum distance d6 is between 0.5 μm and 2 μm. Hence, as compared to the first pixel electrode PE1, the outermost second pixel electrode bars P8 of the second pixel electrode PE8 are closer to the fourth light shielding portion 130*d*. That is, in the present embodiment, by setting the quantity of the second pixel electrode bars P8 to be greater than the quantity of the first pixel electrode bars P1, the outermost second pixel electrode bars P8 can be more close to the fourth light shielding portion 130*d*. In an embodiment, the first maximum spacing MAX1 and the second maximum spacing MAX5 are, for example, 4 μm.

Similar to the embodiment of FIG. 3, in the present embodiment, since the outermost second pixel electrode bars P8 of the second pixel electrode PE8 are closer to the second light shielding portion 130*b*, the liquid crystal efficiency in the second pixel area U2 is increased. As a result, brightness loss in the second pixel area U2 due to the aperture ratio reduction can be compensated, thereby dot mura phenomena can be prevented, and providing the display panel 70 with favorable display quality. In below, benefits and effects of the embodiment of FIG. 9 will further be described with reference to FIG. 10 and FIG. 11.

Figure 10:
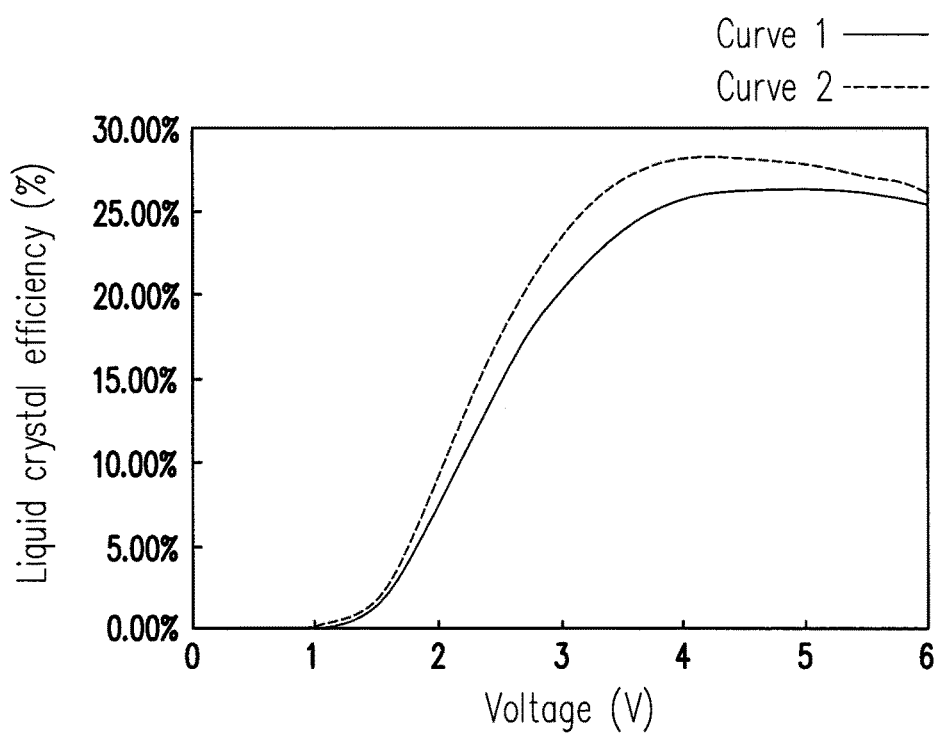
FIG. 10 is a graph illustrating relationship between liquid crystal efficiency and voltage for the first pixel area and the second pixel area in FIG. 9.

FIG. 10 is a graph illustrating relationship between liquid crystal efficiency and voltage for the first pixel area U1 and the second pixel area U2 in FIG. 9, wherein the curve 1 represents the first pixel area U1, and the curve 2 represents second pixel area U2. It can be known from FIG. 10 that, as compared to the first pixel area U1, the second pixel area U2 including the second pixel electrode PE8 having 4 second pixel electrode bars P8 appears to have higher liquid crystal efficiency.

Figure 11:
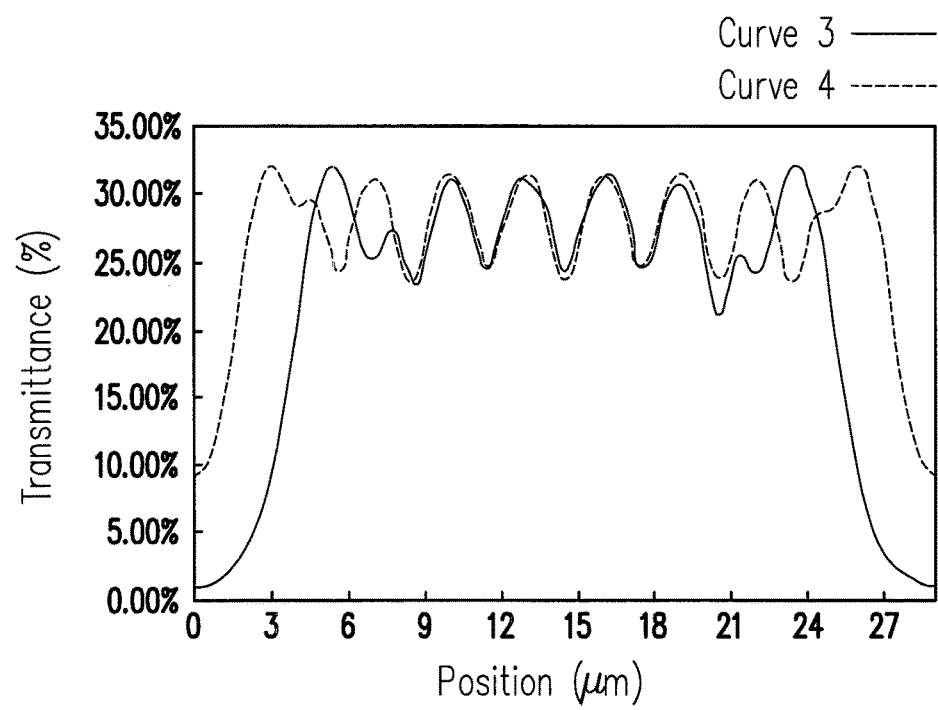
FIG. 11 is a graph illustrating relationship between transmittance and position for the first pixel area and the second pixel area in FIG. 9.

FIG. 11 is a graph illustrating relationship between transmittance and position for the first pixel area U1 and the second pixel area U2 in FIG. 9, wherein positions start to move along the X direction from the point 1 or the point 2 of FIG. 9, the curve 3 represents the first pixel area U1, and the curve 4 represents the second pixel area U2. It can be known from FIG. 11 that, as compared to the first pixel area U1, the second pixel area U2 including the second pixel electrode PE8 having 4 second pixel electrode bars P8 still has favorable transmittance at a region close to the fourth light shielding portion 130*d*.

Figure 12:
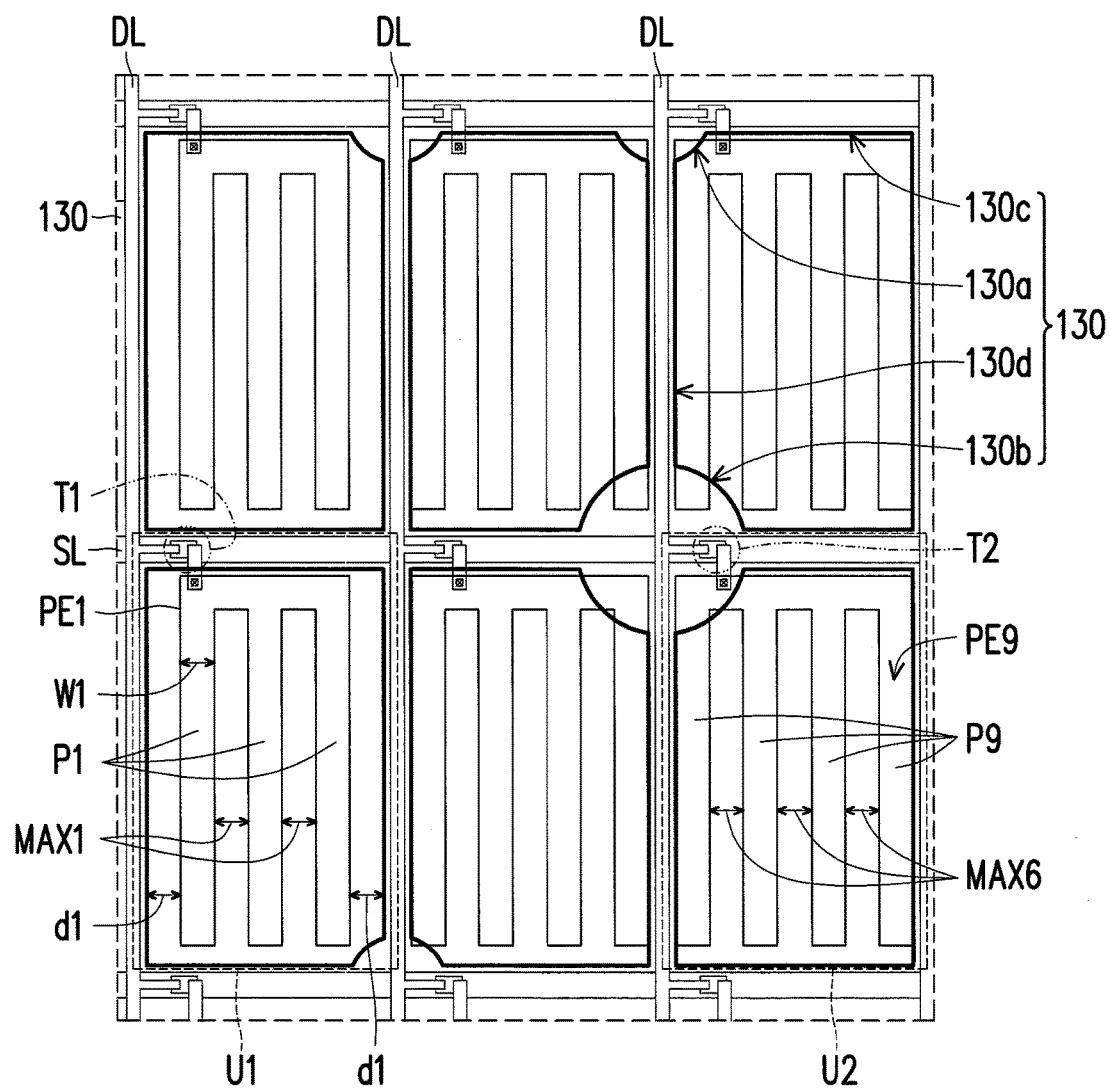
FIG. 12 is a partially enlarged schematic top view illustrating a display panel according to another embodiment of the invention.

FIG. 12 is a partially enlarged schematic top view illustrating a display panel 80 according to another embodiment of the invention. A complete schematic top view of the display panel 80 of FIG. 12 may be referred to FIG. 2, wherein the position where the display panel 80 of FIG. 12 is located may be referred to the position of the area A in FIG. 2. Moreover, the embodiment depicted in FIG. 12 is similar to the embodiment depicted in FIG. 9, and thus identical components are indicated with the same reference numbers, and descriptions thereof will not be repeated.

Referring to FIG. 12 and the FIG. 9, differences between the display panel 80 of the present embodiment and the display panel 70 of the embodiment in FIG. 9 lie in that: on the vertical plane of projection, the outermost second pixel electrode bars P9 of the second pixel electrode PE9 are aligned with the edges of the fourth light shielding portion 130*d*, and a second maximum spacing MAX6 is between any two adjacent second pixel electrode bars P9. That is, on the vertical plane of projection, there is no spacing between the outermost second pixel electrode bars P9 of the second pixel electrode PE9 and the fourth light shielding portion 130*d* connected with the second light shielding portion 130*b*, namely, a distance therebetween is 0 μm. Hence, as compared to the first pixel electrode PE1, the outermost second pixel electrode bars P9 of the second pixel electrode PE9 are closer to the second light shielding portion 130*b*. As a result, the liquid crystal efficiency of the second pixel area U2 can be enhanced, and dot mura phenomena can be prevented, thereby providing the display panel 80 with favorable display quality.

Figure 13:
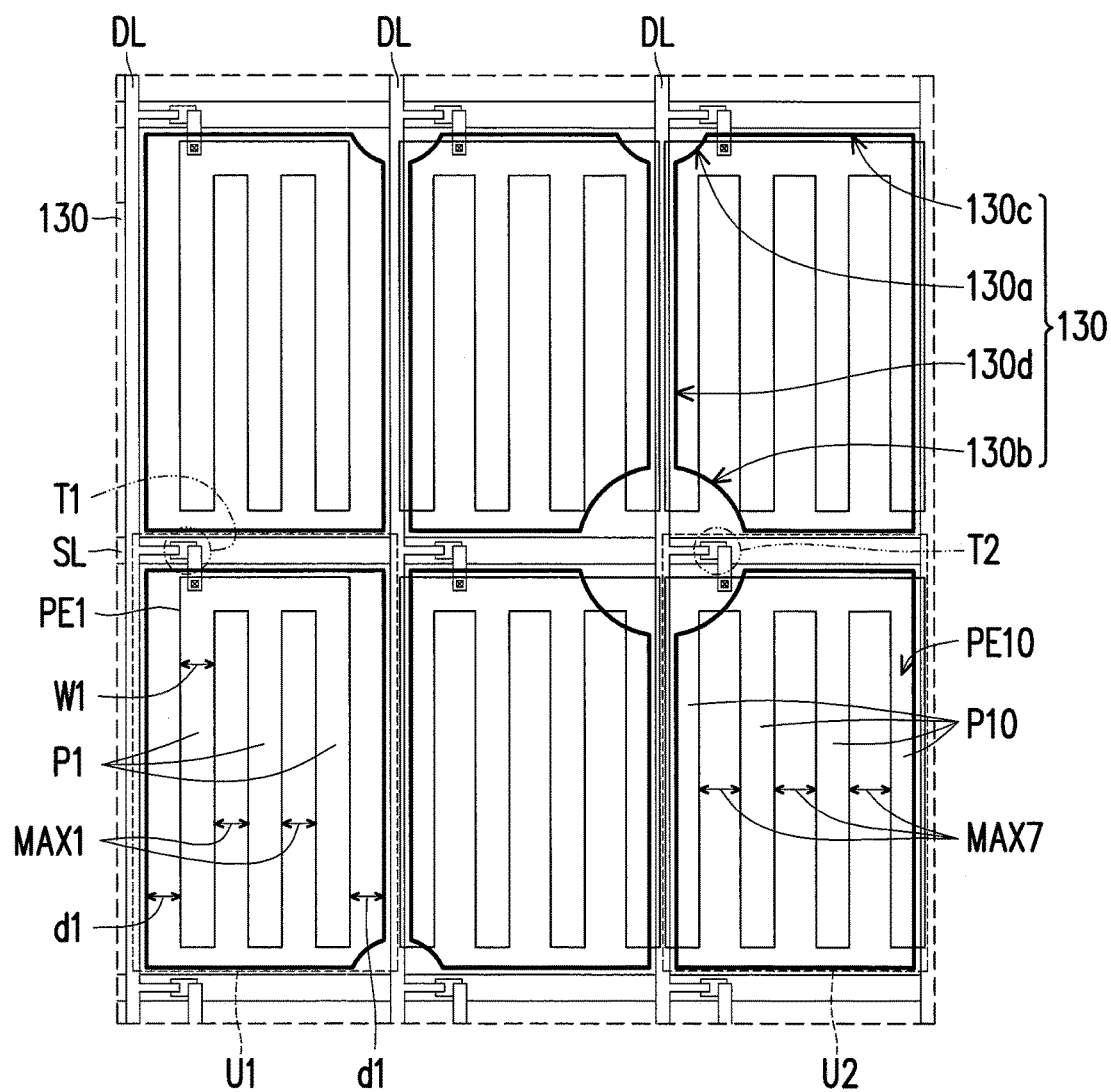
FIG. 13 is a partially enlarged schematic top view illustrating a display panel according to another embodiment of the invention.

FIG. 13 is a partially enlarged schematic top view illustrating a display panel 90 according to another embodiment of the invention. A complete schematic top view of the display panel 90 of FIG. 13 may be referred to FIG. 2, wherein the position where the display panel 90 of FIG. 13 is located may be referred to the position of the area A in FIG. 2. Moreover, the embodiment depicted in FIG. 13 is similar to the embodiment depicted in FIG. 12, and thus identical components are indicated with the same reference numbers, and descriptions thereof will not be repeated.

Referring to FIG. 13 and FIG. 12, differences between the display panel 90 of the present embodiment and the display panel 80 of the embodiment in FIG. 12 lie in that: on the vertical plane of projection, the outermost second pixel electrode bars P10 of the second pixel electrode PE10 and the fourth light shielding portion 130*d* are overlapped; and a second maximum spacing MAX7 is between any two adjacent second pixel electrode bars P10, wherein the second maximum spacing MAX7 is approximately between 1 μm and 5 μm. Hence, as compared to the first pixel area U1, the liquid crystal utilization rate in the second pixel area U2 is higher, and thus brightness loss in the second pixel area U2 due to the aperture ratio reduction can be compensated, thereby dot mura phenomena can be prevented, and providing the display panel 90 with favorable display quality.

The minimum distances d1, d2, d3, d4, d5 and d6 mentioned in the above embodiments are referred to horizontal distances.

Moreover, in the embodiments of FIG. 1 through FIG. 13, the second light shielding portion 130*b* is located at a position corresponded to an intersection of the scan line SL and the data line DL, but the invention is not limited thereto. In below, further descriptions will be provided with reference to FIG. 14.

Figure 14:
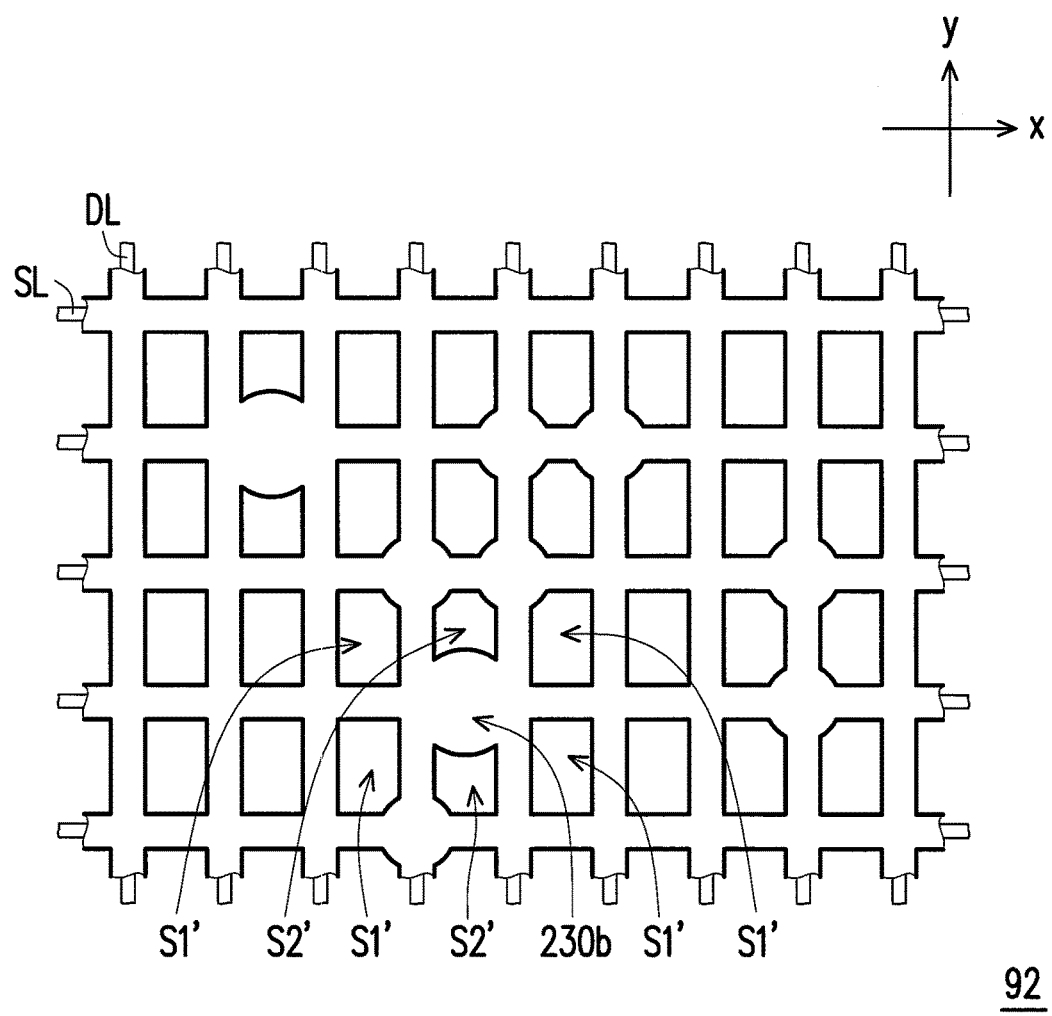
FIG. 14 is a schematic top view illustrating a display panel according to another embodiment of the invention.

FIG. 14 is a schematic top view illustrating a display panel 92 according to another embodiment of the invention. Referring to FIG. 14 and FIG. 2 at the same time, the display panel 92 of FIG. 14 is similar to the display panel 10 of FIG. 2, and thus identical or similar components are indicated with the same or similar reference numbers, and descriptions thereof will not be repeated.

In detail, differences between the display panel 92 of the present embodiment and the display panel 10 of the embodiment in FIG. 2 lie in that: the second light shielding portion 203b of the present embodiment is located at a position between two adjacent pixel structures corresponding to the Y direction. Moreover, same as the embodiment of FIG. 2, in the present embodiment, pixel structures overlapping with the second light shielding portion 230b in the space are defined as the second pixel structures S2', and pixel structures not overlapping with the second light shielding portion 230b are defined as the first pixel structures S1'.

Moreover, according to the above, those skilled in the art should be able to understand that, the first pixel structures S1' in the display panel 92 can be realized by the first pixel structures S1 described in the embodiments of FIG. 1 through FIG. 13; and the second pixel structures S2' can be realized by the second pixel structures S2, the second pixel structures S3, the second pixel structures S4, the second pixel structures S5, the second pixel structures S6, the second pixel structures S7, the second pixel structures S8, the second pixel structures S9 or the second pixel structures S10 described in the embodiments of FIG. 1 through FIG. 13.

In summary, in the display panel provided in the above embodiments, by disposing the second pixel electrode with the second maximum spacing greater than the first maximum spacing of the first pixel electrode in the second pixel area with lower aperture ratio, or the second pixel electrode having the second pixel electrode bars with a quantity greater than that of the first pixel electrode bars, the liquid crystal utilization rate in the second pixel area may be increased, and thus allows the brightness loss due the aperture ratio reduction to be compensated. As a result, dot mura phenomena can be prevented, thereby providing the display panel of the invention with favorable display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel comprising:
a first substrate;
a second substrate disposed opposite to the first substrate;
a plurality of scan lines and a plurality of data lines located on the first substrate;
a plurality of first pixel structures located on the first substrate, at least one of the first pixel structures being electrically connected with the corresponding scan line and the corresponding data line, the at least one of the first pixel structures comprising a first pixel electrode, and the first pixel electrode having a plurality of first pixel electrode bars, wherein a first maximum spacing is formed between two adjacent first pixel electrode bars of the at least one of the first pixel structures;
a plurality of second pixel structures located on the first substrate, the at least one of the second pixel structures being electrically connected with the corresponding scan line and the corresponding data line, the at least one of the second pixel structures comprising a second pixel electrode, and the second pixel electrode having a plurality of second pixel electrode bars, wherein a second maximum spacing formed between two adjacent second pixel electrode bars of the at least one of the second pixel structures is greater than the first maximum spacing; and
a light shielding pattern layer located on the first substrate or on the second substrate, the light shielding pattern layer having a first light shielding portion and a second light shielding portion, an area of the second light shielding portion being greater than an area of the first light shielding portion, wherein the second pixel electrode is close to the second light shielding portion, and the first pixel electrode is away from the second light shielding portion, wherein the light shielding pattern layer further comprises a third light shielding portion and a fourth light shielding portion respectively overlapped with the scan lines and the data lines, and connected with the first light shielding portion and second light shielding portion, and the outermost second pixel electrode bar of the at least one of the second pixel structures and the fourth light shielding portion are not overlapped with each other and have a minimum distance of 0.5 μm to 2 μm therebetween.

2. The display panel as recited in claim 1, wherein a ratio of the second maximum spacing to the first maximum spacing is r, and 1<r≤2.

3. The display panel as recited in claim 1, wherein at least one of the first pixel electrode bars and at least one of the second pixel electrode bars have the same width.

4. The display panel as recited in claim 1, wherein a second minimum spacing different from the second maximum spacing is formed between the two adjacent second pixel electrode bars of the at least one of the second pixel structures.

5. The display panel as recited in claim 1, wherein the two adjacent second pixel electrode bars of the at least one of the second pixel structures are close to one of the data lines.

6. The display panel as recited in claim 1, wherein a distance between any two adjacent second pixel electrode bars of the at least one of the second pixel structures is constant.

7. The display panel as recited in claim 1, wherein a second minimum spacing different from the second maximum spacing is formed between any two adjacent second pixel electrode bars of the at least one of the second pixel structures.

8. A display panel comprising:
a first substrate;
a second substrate located opposite to the first substrate;
a plurality of scan lines and a plurality of data lines located on the first substrate;
a plurality of first pixel structures located on the first substrate, at least one of the first pixel structures being electrically connected with the corresponding scan line and the corresponding data line, the at least one of the first pixel structures comprising a first pixel electrode, and the first pixel electrode having a plurality of first pixel electrode bars;
a plurality of second pixel structures located on the first substrate, the at least one of the second pixel structures being electrically connected with the corresponding scan line and the corresponding data line, the at least one of the second pixel structures comprising a second pixel electrode, and the second pixel electrode having a plurality of second pixel electrode bars, wherein a quantity of the second pixel electrode bars is greater than a quantity of the first pixel electrode bars; and a light shielding pattern layer located on the first substrate or on the second substrate, the light shielding pattern layer having a first light shielding portion and a second light shielding portion, and an area of the second light shielding portion being greater than an area of the first light shielding portion, wherein the second pixel electrode is close to the second light shielding portion, and the first pixel electrode is away from the second light shielding portion, wherein the light shielding pattern layer further has a third light shielding portion and a fourth light shielding portion respectively overlapped with the scan lines and the data lines, and connected with the first light shielding portion and the second light shielding portion, wherein a minimum distance between the outermost second pixel electrode bar in the at least one of the second pixel structures and the fourth light shielding portion is less than a minimum distance between the outermost first pixel electrode bar in the at least one of the first pixel structures and the fourth light shielding portion, and wherein the outermost second pixel electrode bar of the at least one of the second pixel structures and the fourth light shielding portion are not overlapped with each other, and a minimum distance thereof is between 0.5 μm and 2 μm.

9. The display panel as recited in claim 8, wherein the outermost second pixel electrode bar of the at least one of the second pixel structures and the fourth light shielding portion are overlapped.

10. The display panel as recited in claim 8, wherein at least one of the first pixel electrode bars and at least one of the second pixel electrode bars have the same width.

11. A display panel comprising:
a first substrate;
a second substrate disposed opposite to the first substrate;
a plurality of scan lines and a plurality of data lines located on the first substrate;
a plurality of first pixel structures located on the first substrate, at least one of the first pixel structures being electrically connected with the corresponding scan line and the corresponding data line, the at least one of the first pixel structures comprising a first pixel electrode having a plurality of first pixel electrode bars, wherein a first maximum spacing is the maximum of all spacings formed between two adjacent first pixel electrode bars of the at least one of the first pixel structures;

a plurality of second pixel structures located on the first substrate, at least one of the second pixel structures being electrically connected with the corresponding scan line and the corresponding data line, the at least one of the second pixel structures comprising a second pixel electrode having a plurality of second pixel electrode bars, wherein a second maximum spacing is the maximum of all spacings formed between two adjacent second pixel electrode bars of the at least one of the second pixel structures and the second maximum spacing is greater than the first maximum spacing; and a light shielding pattern layer located on the first substrate or on the second substrate, the light shielding pattern layer having a first light shielding portion, a second light shielding portion, a third light shielding portion and a fourth light shielding portion, an area of the second light shielding portion being greater than an area of the first light shielding portion, wherein the second pixel electrode is close to the second light shielding portion, the first pixel electrode is away from the second light shielding portion, and the outermost second pixel electrode bar of the at least one of the second pixel structures and the fourth light shielding portion are not overlapped with each other and have a minimum distance of 0.5 μm to 2 μm therebetween.

12. The display panel as recited in claim 11, wherein a ratio of the second maximum spacing to the first maximum spacing is r, and $1 < r \leq 2$.

13. The display panel as recited in claim 11, wherein the third light shielding portion and the fourth light shielding portion are respectively overlapped with the scan lines and the data lines, and are connected with the first light shielding portion and second light shielding portion.

* * * * *